(12) United States Patent
Nilsen et al.

(10) Patent No.: US 8,092,692 B2
(45) Date of Patent: Jan. 10, 2012

(54) APPARATUS AND METHOD FOR SEPARATING IMMISCIBLE FLUID COMPONENTS

(75) Inventors: Pål J. Nilsen, Bødalen (NO); Matteo Chiesa, Grängesberg, MA (US)

(73) Assignee: Hamworthy PLC, Poole (GB)

( * ) Notice: Subject to any disclaimer, the term of this patent is extended or adjusted under 35 U.S.C. 154(b) by 743 days.

(21) Appl. No.: 12/159,625

(22) PCT Filed: Dec. 23, 2006

(86) PCT No.: PCT/IB2006/003766
§ 371 (c)(1),
(2), (4) Date: Jun. 29, 2008

(87) PCT Pub. No.: WO2007/074379
PCT Pub. Date: Jul. 5, 2007

(65) Prior Publication Data
US 2009/0008342 A1 Jan. 8, 2009

(30) Foreign Application Priority Data
Dec. 28, 2005 (NO) .................................. 20056231

(51) Int. Cl.
*B01D 17/035* (2006.01)
*B01D 17/038* (2006.01)
(52) U.S. Cl. .................. 210/788; 210/221.2; 210/512.1; 210/512.3; 209/722; 209/725; 55/459.1; 55/459.4
(58) Field of Classification Search .................. 210/788, 210/221.2, 512.1, 512.3; 209/722, 725; 55/459.1, 55/459.4
See application file for complete search history.

(56) References Cited

U.S. PATENT DOCUMENTS

| 4,478,712 A | 10/1984 | Arnaudeau |
| 4,876,016 A | 10/1989 | Young et al. |
| 5,084,189 A | 1/1992 | Richter |
| 5,667,686 A * | 9/1997 | Schubert ........................ 210/788 |
| 5,904,840 A | 5/1999 | DiBella |

FOREIGN PATENT DOCUMENTS

| EP | 07909121 A2 | 5/1996 |
| JP | 61093850 A | 5/1986 |
| SU | 899150 A | 1/1982 |
| WO | WO-01/00296 A1 | 1/2001 |

OTHER PUBLICATIONS

PCT/ISA/210—International Search Report—Apr. 27, 2007.
Norwegian Search Report—Jun. 22, 2006.

* cited by examiner

*Primary Examiner* — David A Reifsnyder
(74) *Attorney, Agent, or Firm* — Venable LLP; Eric J. Franklin

(57) ABSTRACT

A separator apparatus for separating immiscible fluid components of different specific gravities. A body includes an internal flow channel for a mixture of fluid components to be separated. A rotation generating device brings the fluid mixture to rotate about the longitudinal axis of the flow channel. An extraction device withdraws a central part of the rotating fluid mixture flowing through the flow channel. A bubble introducer introduces micro-sized gas bubbles into the fluid mixture so as to thereby enhance the separation of the fluid components. Also a method for separating immiscible fluid components of different specific gravities.

9 Claims, 2 Drawing Sheets

APPARATUS AND METHOD FOR SEPARATING IMMISCIBLE FLUID COMPONENTS

CROSS-REFERENCE TO RELATED APPLICATIONS

This application claims priority to Norwegian patent application 20056231 filed 28 Dec. 2005 and is the national phase under 35 U.S.C. §371 of PCT/IB2006/003766 filed 23 Dec. 2006.

FIELD OF THE INVENTION AND PRIOR ART

The present invention relates to a separator apparatus for separating immiscible fluid components of different specific gravities. The invention also relates to a method for separating immiscible fluid components of different specific gravities.

Separators for separating immiscible fluid components of different specific gravities by subjecting a fluid mixture to the action of centrifugal forces are previously known, e.g. from U.S. Pat. No. 4,478,712 A and U.S. Pat. No. 5,084,189 A. These prior art separators comprises means for bringing a fluid mixture to rotate about the longitudinal axis of a flow channel so as to thereby make immiscible fluid components of different specific gravities included in the fluid mixture to migrate, under the action of centrifugal forces, towards mutually different parts of the flow channel. Fluid components of higher specific gravity are driven towards the peripheral part of the flow channel, whereas fluid components of lower specific gravity are concentrated to the central part of the flow channel.

SUMMARY OF THE INVENTION

The object of the present invention is to provide an improved separator apparatus for separating immiscible fluid components of different specific gravities.

According to the invention, this object is achieved by a separator apparatus.

The inventive separator apparatus comprises:
- a body provided with an internal flow channel for a mixture of fluid components to be separated, the flow channel having an inlet for receiving the fluid mixture and an outlet;
- a rotation generating device for bringing the fluid mixture to rotate about the longitudinal axis of the flow channel as it flows through the flow channel between the inlet and the outlet thereof so as to thereby make immiscible fluid components of different specific gravities included in the fluid mixture to migrate, under the action of centrifugal forces, towards mutually different parts of the flow channel;
- an extraction device for withdrawing, upstream of the outlet of the flow channel, a central part of the rotating fluid mixture flowing through the flow channel; and
- bubble introducing means for introducing, upstream of the extraction device and at the periphery of the flow channel, microsized gas bubbles into the fluid mixture flowing through the flow channel, upstream and/or downstream of the rotation generating device, so as to thereby enhance the separation of said immiscible fluid components of different specific gravities.

In this description and the subsequent claims, the term "microsized gas bubbles" refers to small gas bubbles having a diameter smaller than about 100 µm. In the following, the "micro-sized gas bubbles" will also be referred to as "micro bubbles".

The inventive separator apparatus effects a separation of fluid components of different specific gravities by centrifugal action enhanced by the separating effect caused by micro bubbles. The micro bubbles introduced into the fluid mixture will, due to their low specific gravity, rapidly migrate towards the central part of the flow channel. Fluid components of lighter specific gravity will adhere to the micro bubbles and will be carried along by the micro bubbles towards the central part of the flow channel, which will enhance the effect of the centrifugal separation and speed up the separation of the different fluid components.

The inventive separator apparatus is of rather simple and compact construction and is well suited for use in topside as well as subsea installations for processing well fluids. The inventive separator apparatus may e.g. be used for treating water comprising oil residues in order to reduce the oil-in-water content thereof and is capable of coping with comparatively high concentrations of the dispersed phase. The inventive separator apparatus is capable of processing fluid flow with an oil concentration substantially exceeding the maximum allowed oil concentration of conventional water treatment units. The use of small micro-sized gas bubbles gives a large possible contact surface between gas bubbles and oil droplets. In a conventional floatation unit, the rising velocity of small gas bubbles is rather low. With the inventive solution, the velocity of the small micro-sized gas bubbles is increased by applying high centripetal forces achieved by rotating the fluid mixture carrying the gas bubbles. An additional advantage of using high centripetal forces is that the centripetal force is directed towards the axis of rotation, which makes the oil droplets migrate towards the axis of rotation. This makes the skimming process easy to control and makes possible a reduced reject flow.

Further advantages as well as advantageous features of the inventive separator apparatus will appear from the following description.

The invention also relates to a method.

BRIEF DESCRIPTION OF THE DRAWING

With reference to the appended drawing, a specific description of preferred embodiments of the invention cited as examples follows below.

DETAILED DESCRIPTION OF PREFERRED EMBODIMENTS OF THE INVENTION

Figure 1:
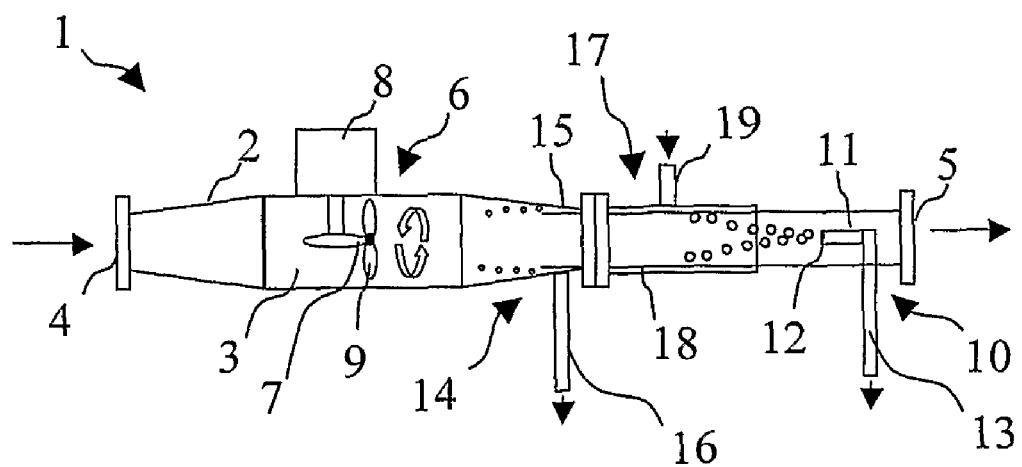
FIG. 1 is a schematic, partly cut sectional view of a separator apparatus according to an embodiment of the present invention.

FIG. 1 illustrates a separator apparatus 1 according to the present invention for separating immiscible fluid components of different specific gravities. The separator apparatus 1 comprises a tubular body 2 provided with an internal flow channel 3 for a mixture of fluid components to be separated. The flow channel has an inlet 4 for receiving a fluid mixture to be separated and an outlet 5. The separator apparatus 1 is provided with a rotation generating device 6 for bringing a received fluid mixture to rotate about the longitudinal axis of the flow channel 3 as it flows through the flow channel between the inlet 4 and the outlet 5 thereof so as to thereby make immiscible fluid components of different specific gravities included in the fluid mixture to migrate, under the action of centrifugal forces caused by the fluid rotation, towards mutually different parts of the flow channel. Fluid components of higher specific gravity will migrate towards the peripheral part of the flow channel, whereas fluid components of lower specific gravity will migrate to the central part of the flow channel.

In the illustrated example, the rotation generating device 6 comprises an impeller 7 arranged in the flow channel 3 for bringing the fluid mixture to rotate about the longitudinal axis of the flow channel. The impeller 7 is driven in rotation by a motor 8, e.g. in the form of an electric or hydraulic motor. The speed of the motor 8 is preferably adjustable so as to make possible an adjustment of the impeller speed and thereby an adjustment of the centrifugal force. Furthermore, the impeller 7 is suitably provided with impeller blades 9 having an adjustable inclination so as to thereby make possible an adjustment of the fluid pressure, which enhances the flexibility with respect to the installation of the separator apparatus in a fluid treatment system and the routing of the reject flow.

The impeller may be designed to give positive head if so needed in a system provided with the separator apparatus 1, e.g. if pumps arranged downstream of the separator apparatus 1 have suction head limitations. A positive head from the separator apparatus 1 gives more flexibility with respect to the implementation of the separator apparatus in existing systems, since a positive head allows the reject flows from the separator apparatus to be more easily routed to appropriate destinations. It should be possible to have adjustable impeller blades to control both rotational speed (separation force) and head at the same time.

Figure 2:
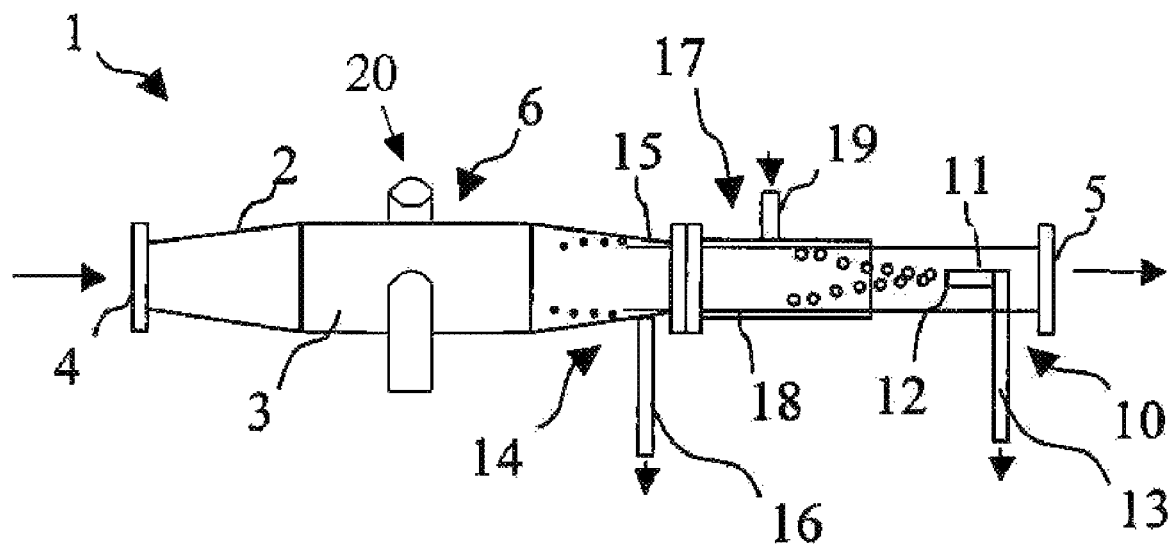
FIG. 2 is a schematic, partly cut sectional view of a separator apparatus according to another embodiment of the present invention.

As an alternative to or in combination with an impeller, the rotation generating device 6 may comprise fluid injectors 20, shown in FIG. 2, arranged to inject fluid jets, e.g. in the form of gas jets, tangentially into the flow channel 3 so as to thereby bring the fluid mixture to rotate about the longitudinal axis of the flow channel.

The separator apparatus 1 comprises a first extraction device 10 for withdrawing, upstream of the outlet 5 of the flow channel, a central part of the rotating fluid mixture flowing through the flow channel 3. Thus, the first extraction device 10 is arranged to withdraw, from the rotating fluid mixture, lighter fluid components that have been concentrated at the central part of the flow channel 3. These withdrawn fluid components constitute the so-called reject flow. In the illustrated example, the first extraction device 10 comprises a tubular collecting member 11 arranged centrally in the flow channel 3 and having an inlet opening 12 facing the upstream end of the flow channel. The collecting member 11 is connected to a discharge conduit 13, which e.g. may be arranged to feed the withdrawn fluid to a processing apparatus for further processing thereof.

In the illustrated example, the separator apparatus 1 also comprises a second extraction device 14 for withdrawing a peripheral part of the rotating fluid mixture flowing through the flow channel 3. Thus, the second extraction device 14 is arranged to withdraw, from the rotating fluid mixture, heavier fluid components, such as sand particles or the similar that have been concentrated close to the inner wall of the flow channel 3. In the illustrated example, the second extraction device 14 comprises a collecting member 15 arranged at the inner wall of the flow channel 3 upstream of the first extraction device 10. The collecting member 15 is connected to a discharge conduit 16.

The separator apparatus 1 further comprises bubble introducing means 17 for introducing, upstream of the first extraction device 10 and at the periphery of the flow channel 3, micro-sized gas bubbles, so-called micro bubbles, into the rotating fluid mixture flowing through the flow channel so as to thereby enhance the separation of said immiscible fluid components of different specific gravities. The collecting member 15 of the second extraction device 14 is arranged upstream of the section of the flow channel 3 where micro bubbles are introduced by the bubble introducing means 17.

In the illustrated embodiment, the bubble introducing means 17 comprises a micro porous member 18 forming part of the wall of the flow channel 3, and gas feeding means 19 for feeding gas, e.g. in the form of compressed natural gas, through the micro porous member 18 so as to thereby generate micro bubbles. The bubble introducing means 17 may comprise ultrasonic means, not shown, for generating ultrasonic waves, which are directed to the micro porous member 18 so as to subject it to vibration and thereby enhance the generation of finer bubbles with high sphericality and uniform size distribution.

Figure 3:
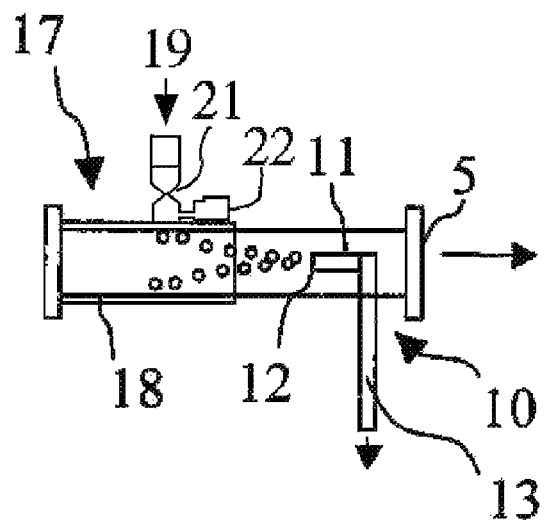
FIG. 3 is a schematic, partly cut sectional view of a downstream section of a separator apparatus according to an embodiment of the present invention highlighting an alternative embodiment of a gas introducer.

As an alternative to or in combination with a micro porous member 18, the bubble introducing means 17 may comprise high pressure nozzles 21, shown in FIG. 3, arranged to inject gas jets into the flow channel 3 so as to thereby generate micro bubbles. The bubble introducing means 17 may comprise ultrasonic means 22, shown in FIG. 3, for generating ultrasonic waves, which are directed to the high pressure nozzles so as to subject them to vibration and thereby enhance the generation of finer bubbles with high sphericality and uniform size distribution.

The inventive separator apparatus 1 may with advantage be included in an oil well fluid processing system for separating heavier and lighter components of well fluid emanating from a well, such as e.g. a subsea well. The inventive apparatus could also be used in an offshore topside or a land-based oil well fluid processing system. The separator apparatus according to the invention is capable of handling produced water containing up to about 3% by volume of oil, i.e. more than ten times the traditional limit for a conventional produced water separator apparatus.

The invention is of course not in any way restricted to the embodiments described above. On the contrary, many possibilities to modifications thereof will be apparent to a man with ordinary skill in the art without departing from the basic idea of the invention such as defined in the appended claims.

For example, the introduction of micro-sized bubbles into the fluid mixture flowing through the flow channel, may as an alternative to or in any combination with e.g. the above-described embodiments be accomplished by tangential injection of gas, such as highly pressurized water which is gas saturated, upstream and/or downstream of the rotation generating device. Here the gas will be released by flashing into the fluid mixture due to a pressure reduction.

The invention claimed is:

1. A separator apparatus for separating immiscible fluid components of different specific gravities, the separator apparatus comprising:
    a body comprising an internal flow channel for a mixture of fluid components to be separated, the flow channel having an inlet for receiving the fluid mixture and an outlet;
    a rotation generating device for bringing the fluid mixture to rotate about a longitudinal axis of the flow channel as the fluid mixture flows through the flow channel between the inlet and the outlet thereof so as to thereby make immiscible fluid components of different specific gravities included in the fluid mixture to migrate, under action of centrifugal forces, towards mutually different parts of the flow channel;

a first extraction device for withdrawing, upstream of the outlet of the flow channel, a central part of the rotating fluid mixture flowing through the flow channel, a bubble introducer configured to introduce, upstream of the first extraction device and at a periphery of the flow channel, micro-sized gas bubbles into the fluid mixture flowing through the flow channel, upstream and/or downstream of the rotation generating device, and a second extraction device for withdrawing, upstream of a section of the flow channel where micro-sized gas bubbles are introduced by the bubble introducer, a peripheral part of the rotating fluid mixture flowing through the flow channel, so as to thereby enhance the separation of said immiscible fluid components of different specific gravities.

2. The separator apparatus according to claim 1, wherein the rotation generating device comprises an impeller arranged in the flow channel for bringing the fluid mixture to rotate about the longitudinal axis of the flow channel.

3. The separator apparatus according to claim 2, wherein the impeller comprises impeller blades having an adjustable inclination.

4. The separator apparatus according to claim 1, wherein the rotation generating device comprises fluid injectors arranged to inject fluid jets tangentially into the flow channel so as to thereby bring the fluid mixture to rotate about the longitudinal axis of the flow channel.

5. The separator apparatus according to claim 1, wherein the bubble introducer comprises a micro porous member forming part of the wall of the flow channel, and a gas feed configured to feed gas through the micro porous member so as to thereby generate micro-sized gas bubbles.

6. The separator apparatus according to claim 5, wherein the bubble introducer comprises an ultrasonic generator configured to genterate ultrasonic waves, the ultrasonic generator being arranged to direct ultrasonic waves to the micro porous member so as to subject it to vibration.

7. The separator apparatus according to claim 1, wherein the bubble introducer comprises high pressure nozzles arranged to inject gas jets into the flow channel so as to thereby generate micro-sized gas bubbles.

8. The separator apparatus according to claim 7, wherein the bubble introducer comprises an ultrasonic generator configured to generate ultrasonic waves, the ultrasonic generator being arranged to direct ultrasonic waves to the high pressure nozzles so as subject them to vibration.

9. A method for separating immiscible fluid components of different specific gravities, the method comprising:

feeding a mixture of fluid components to be separated through a flow channel from an inlet to an outlet of the flow channel;

bringing the fluid mixture to rotate about a longitudinal axis of the flow channel as the fluid mixture flows through the flow channel so as to thereby make immiscible fluid components of different specific gravities included in the fluid mixture to migrate, under action of centrifugal forces, towards mutually different parts of the rotating fluid mixture flowing through the flow channel;

introducing, at a periphery of the flow channel, micro-sized gas bubbles into the fluid mixture flowing through the flow channel, so as to thereby enhance the separation of said immiscible fluid components of different specific gravities;

withdrawing, downstream of a section of the flow channel where micro-sized gas bubbles are introduced and upstream of the outlet of the flow channel, a central part of the rotating fluid mixture flowing through the flow channel, and withdrawing upstream of the section of the flow channel where micro-sized gas bubbles are introduced a peripheral part of the rotating fluid mixture flowing through the flow channel.

* * * * *

UNITED STATES PATENT AND TRADEMARK OFFICE
CERTIFICATE OF CORRECTION

| | | |
|---|---|---|
| PATENT NO. | : 8,092,692 B2 | Page 1 of 1 |
| APPLICATION NO. | : 12/159625 | |
| DATED | : January 10, 2012 | |
| INVENTOR(S) | : Pål Nilsen et al. | |

It is certified that error appears in the above-identified patent and that said Letters Patent is hereby corrected as shown below:

Title page, change item (75)

"(75)   Inventors: Pål J. Nilsen, Bødalen (NO); Matteo Chiesa, Grängesberg, MA (US)"

to

--(73)   Inventors: Pål J. Nilsen, Bødalen (NO); Matteo Chiesa, Sommerville, MA (US)--

Signed and Sealed this
Twelfth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,092,692 B2
APPLICATION NO. : 12/159625
DATED : January 10, 2012
INVENTOR(S) : Pål J. Nilsen et al.

It is certified that error appears in the above-identified patent and that said Letters Patent is hereby corrected as shown below:

Title page, change item (75)

"(75)  Inventors: Pål J. Nilsen, Bødalen (NO); Matteo Chiesa, Grängesberg, MA (US)"

to

--(75)  Inventors: Pål J. Nilsen, Bødalen (NO); Matteo Chiesa, Sommerville, MA (US)--

This certificate supersedes the Certificate of Correction issued February 12, 2013.

Signed and Sealed this
Nineteenth Day of March, 2013

Teresa Stanek Rea
*Acting Director of the United States Patent and Trademark Office*